United States Patent [19]

Veltze

[11] Patent Number: 4,814,624
[45] Date of Patent: Mar. 21, 1989

[54] METHOD AND APPARATUS FOR MEASURING THE POSITION OF AN OBJECT BOUNDARY

[76] Inventor: Janusz A. Veltze, 20 Perryn Road, Acton, London, England, W3 7NA

[21] Appl. No.: 57,926
[22] PCT Filed: Oct. 9, 1986
[86] PCT No.: PCT/GB86/00611
  § 371 Date: Jun. 2, 1987
  § 102(e) Date: Jun. 2, 1987
[87] PCT Pub. No.: WO87/02449
  PCT Pub. Date: Apr. 23, 1987

[30] Foreign Application Priority Data

Oct. 9, 1985 [GB] United Kingdom ............... 8524897

[51] Int. Cl.$^4$ ................................................ G01B 9/08
[52] U.S. Cl. ..................................... 250/560; 356/392
[58] Field of Search ........................... 250/560, 561; 356/391–394, 376

[56] References Cited

U.S. PATENT DOCUMENTS 3,108,727 10/1963 Farber ................................. 250/561
3,365,699 1/1968 Foster ................................. 250/560
4,167,678 9/1979 Mischo et al. ....................... 250/560

OTHER PUBLICATIONS

IBM Journal of Research and Development, vol. 17, No. 6, Nov. 1973, New York (US) M. Kallmeyer et al: "Rapid, Precise, Computer-Controlled Measurement of XY-coordinates", pp. 490–499, see p. 491, paragraph 1– p. 494, paragraph 1, FIGS. 1, 3, 4.
Patents Abstracts of Japan, vol. 9, No. 101 (P-353) (1824) 2 May 1985 & JP A, 59226802 (Mitsutoyo Seisku-sho K.K.).
Patents Abstracts of Japan, vol. 9, No. 199 (P-380) (1922) 16 Aug. 1985 & JP. A 6063402 (Nihon Kougaku Kogyo K.K.).

Primary Examiner—David C. Nelms
Assistant Examiner—Stephone B. Allen
Attorney, Agent, or Firm—Nixon & Vanderhye

[57] ABSTRACT

The position of the boundary of an object is measured by forming an optical image of the part of the object of interest as the object part is moved past the end of a thin optical fibre. A photodetector receives the light from the fibre and applies an output to a comparator where it is compared with a reference derived from the light source illuminating the object. The output of the comparator triggers the recording of coordinate value signals from transducers responsive to the relative positions of the object and the end of the optical fibre. The signal paths connected to the recorder are arranged to have the same delays so that no error arises from different speeds of movement. A computer can control the movement of the object and record the positions of different parts of the boundary so that the size of the object can be calculated. The reference can be derived from an area concentric with but larger than the end of the optical fibre.

19 Claims, 6 Drawing Sheets

METHOD AND APPARATUS FOR MEASURING THE POSITION OF AN OBJECT BOUNDARY

This invention relates to the measurement of the position of an object boundary enabling, for example, the exact measurement of the size of the object.

The measurement of position of an edge of optically formed image is conventionally carried out with the aid of an optical system equipped with a co-ordinate measuring stage and cross-wire or some form of reference marker which is aligned to coincide with the edge under investigation and the position of the edge can thus be recorded.

This method has a number of disadvantages. It is slow, dependent on subjective judgment and fatigue of operator and therefore may produce inconsistent results.

With the growing requirement for automated non-contact measuring systems there is need for rapid, precise and consistent measurement of edge position on optical images under dynamic conditions. Such measurements find use, for instance, in high precision metrology applications, where it is necessary to obtain dimensional information on engineering components.

It is an object of the present invention to provide an improved method and apparatus for measuring the position of an object boundary.

According to a first aspect of the present invention there is provided a method of measuring the position of an object boundary in which the object boundary is moved relative to a detector and an indication of the position of the object boundary relative to a datum point fixed in relation to the detector is produced continuously for recording in a recording means, and the value of the indication is recorded by the recording means on detection by the detector of the object boundary, the detection signal and the indication undergoing equal delays in their transmission to the recording means.

According to a second aspect of the present invention there is provided apparatus for measuring the position of the boundary of an object including a support for the object, optical means for forming an image of at least part of the object boundary on a screen which may be virtual, a first optical fibre of relatively small diameter coupling first area of the screen to a first light intensity responsive detector, a second optical fibre of relatively large diameter coupling from a second area of the screen substantially concentric with the first area to a second light intensity responsive detector, the support and the screen being relatively movable, comparator means for comparing the signals from the first and second detectors and producing an output signal when the two detector signals have a predetermined relationship, transducer means coupled to the support producing an electrical signal representing the position of the support relative to the screen, and recording means connected to the transducer means for recording the position of the support at the instant the comparator means produces the output signal.

According to a third aspect of the present invention there is provided a method of measuring the position of an edge comprising the steps of: placing the edge on a movable support, illuminating the edge by means of a light source, forming an image of the illuminated edge on a screen, conveying the light from a particular fixed area on the screen to a light intensity responsive detector, deriving a first electrical signal representing the light intensity at the area from the detector, deriving a second electrical signal in response to light from the light source including light other than from the area, passing the first and second electrical signals through first and second channels respectively to a comparator, the comparator producing an output signal when the first and second electrical signals have a predetermined relationship, moving the movable support so that the image of the edge on the screen moves acoss the particular area, producing a third electrical signal representing the instantaneous position of the support as it moves, conveying the third electrical signal along a third channel to a recording means, and recording a representation of the position of the support in the recording means at the instant the output signal from the comparator is applied to the recording means, the time delay for the transmission of an electrical signal representing the edge from the detector to the recording means being substantially equal to the time delay for the transmission of the third electrical signal from the support to the recording means.

According to a fourth aspect of the present invention there is provided apparatus for measuring the position of an edge including a movable support on which the edge is mounted, a light source for illuminating the edge, means for forming an image of the edge on a screen, optical fibre means facing a particular fixed area of the screen for coupling light it receives from that area to a light intensity responsive detector for producing a first electrical signal representing the light received, a second means responsive to light from the source including light not from the particular area for producing a second electrical signal, a comparator for producing an output signal when the two signals applied to it have a predetermined relationship, first and second channels respectively for transmitting the first and second electrical signals to the comparator, transducer means coupled to the support for producing a third electrical signal representing the position of the support, recording means connected to receive the third electrical signal via a third channel and responsive to the output signal from the comparator to record a representation of the position of the support at that instant, the time delays imposed on the representation of the edge conveyed by the first electrical signal from the detector through the comparator to the recording means and on the representation of the position of the support conveyed by the third electrical signal from the transducing means to the recording means being arranged to be equal.

According to a fifth aspect of the present invention there is provided apparatus for measuring the position of an edge including a movable support on which the edge is mounted, a light source for illuminating the edge, means for forming an image of the edge on a screen, light splitting means for directing light from a first relatively small circular area of the screen to a first light responsive detector and from a relatively large circular area of the screen substantially concentric with the small circular area to a second light responsive detector, the first and second detectors being for producing first and second electrical signals respectively representing the light received, a comparator for producing an output signal when the two signals applied to it have a predetermined relationship, first and second channels respectively for transmitting the first and second electrical signals to the comparator, transducer means coupled to the support for producing a third electrical signal representing the position of the support, recording means connected to receive the third electrical signal via a third channel and responsive to the output signal from the comparator to record a representation of the position of the support at that instant, the time delays imposed on the representation of the edge conveyed by the first electrical signal from the detector through the comparator to the recording means and on the representation of the position of the support conveyed by the third electical signal from the transducing means to the recording means being arranged to be equal.

Preferably the object is mounted on a movable support so that the area of interest always lies close the optical axis of the lens used to form the image and the photodetectors with their associated optical fibres can be rigidly mounted. Although reference is made to a screen on which an image of the object boundary is focused, it is not necessary for the screen to be a physical entity, it may merely be the focal plane of the lens forming the image.

The invention can measure the position of the edge of an optical image precisely and rapidly, avoiding the need for manual alignment of a workpiece with a crosswire. The measurement can be done dynamically without stopping the edge under the detector.

The light used may be visible, ultra-violet or infrared, the detectors and optical components being chosen suitably. The use of visible light would enable an operator to observe the operation.

The transducers providing electrical signals representing the position of the movable support on which the object is carried may each consist of a diffraction grating scale, of say 10 micron pitch, with quadrature cursor gratings producing sine and cosine output signals. The complete cycles of the output signals may be counted digitally and one or more additional digits calculated from the sine and cosine signal values. The recording means may be digital registers, one for each axis of movement of the support, for recording the complete cycles, with analogue to digital converters for the sine and cosine values staticised at the sampling instant from which the interpolated digits are calculated and inserted at the ends of the registers.

The operation of the apparatus may be controlled by a microprocessor or small computer programmed to move the object on its support so that the positions of parts of the boundary of the object can be measured and the size of the object calculated from the measurements. For example, if the object circular the positions of three or more points on its periphery would enable its diameter to be calculated, using least square fitting if more than three points are used.

The use of a comparator or differential amplifier to detect the transition from light to dark or vice versa at the edge means that the edge detection is substantially without hysteresis, so that the edge position can be measured accurately in either direction.

In a typical application the object uner investigation is placed on a co-ordinate stage at the focal plane of an optical system and the stage is moved, e.g. under manual or computer control, so that the edge of the image crosses the sensor aperture, the area sensed by the light detector.

At the instant the edge passes the sensor aperture a signal is set from the detector to the co-ordinate position register unit and the position of the stage is recorded at that instant.

The recorded information together with the polarity of transition can be transmitted to a computer for further processing and data logging.

In practical application it is most desirable to be able to read the edge position "on-the-fly" at different traversing speeds.

In order to ensure that the co-ordinate information is registered correctly the signal propagation delay through the edge sensor circuitry must be equal to that through the co-ordinate circuitry.

In other words it is necessary to ensure that the trigger pulse arrives at the co-ordinate value register without delay or if this is impossible, as it is in this case mainly due to exceedingly low signal level, it is sufficient to ensure that the propagation of the positional information arriving at the co-ordinate value register is delayed by the same amount so that both signals are coincident at the co-ordinate value register.

In principle it should be sufficient to increase the bandwidth of the trigger circuitry until the delay becomes insignificant. In practice, however, the bandwidth cannot be made arbitrarily wide. The amount of light energy available in these applications is usually very small and the generated signal requires substantial amplification. Even the most advanced analogue amplifiers are too 'noisy' for this application. Excessive noise produces scatter and essentially reduces the accuracy of measurement. To achieve the required accuracy it is necessary and sufficient to reduce the scatter to a level below the limit of resolution of the measuring system.

In these circumstances, bandwidth reduction is the only way to control the noise. This, however, has the undesirable effect of introducing a group delay which makes the edge position measurements speeds dependent. This speed dependence makes accurate measurement impossible except in applications where the speed can be controlled during the transition over an edge. Even in motor driven applications it is almost impossible to control the speed at all times.

For instance, when the edge is encountered at an oblique angle, velocity components in any two orthogonal directions will depend on the angle. Therefore in order to control the velocity of the transition it is necessary to know, in advance, not only the co-ordinate position at which the edge will be encountered but also its orientation.

In most practical situations this is not possible since such information is not known in advance.

In examples of the present invention this problem is overcome by providing matched filters in the signal paths so that the group delays are equal.

The examples of the invention are designed to reduce noise to a minimum, since by keeping noise down it is possible to increase bandwidth to a level which allows the edge to have speeds of several meters per second at the image plane, without adversely affecting accuracy.

In order that the invention may be fully understood and readily carried into effect examples of it will now be described with reference to the accompanying drawings, of which:

Figure 1:
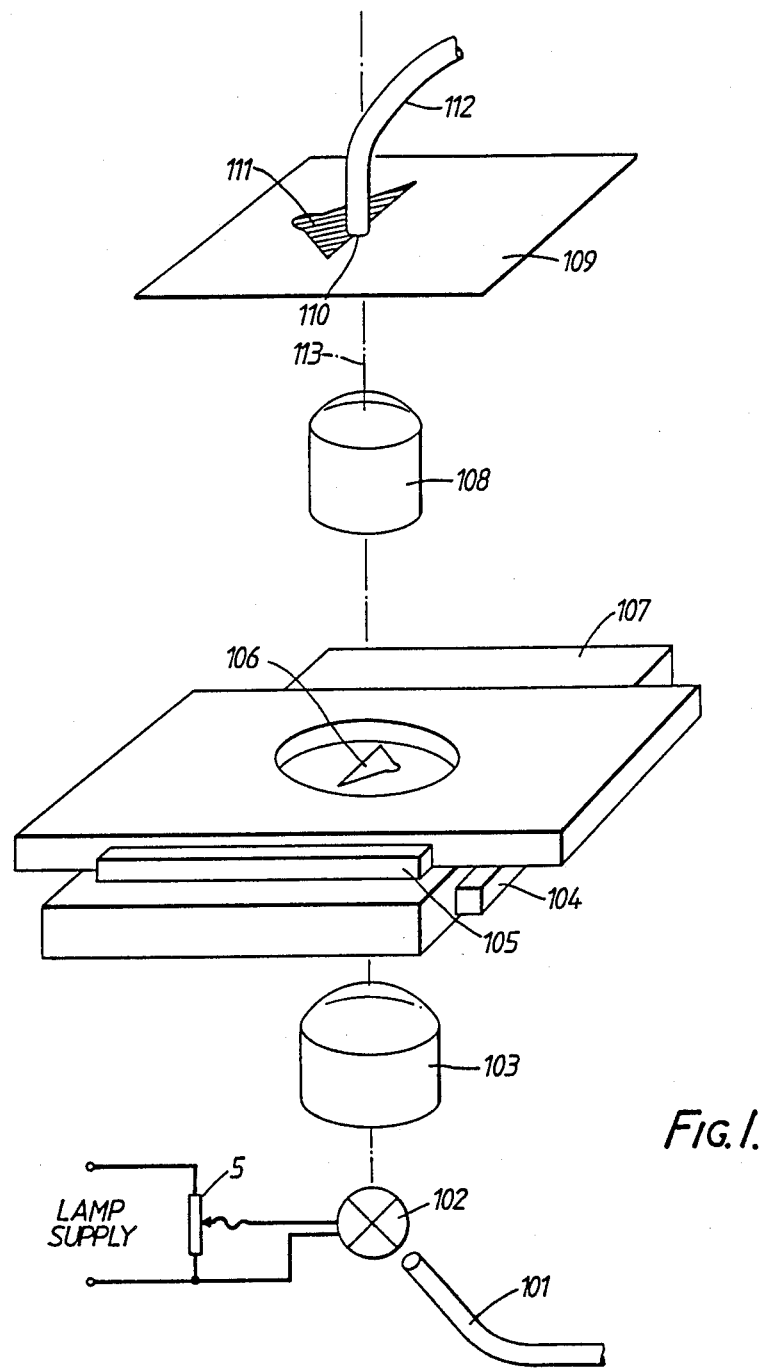
FIG. 1 is a diagram of the physical layout of the non-electrical part of an example of the invention.

A possible physical layout of the apparatus is shown in FIG. 1. An object 106 to be measured is carried on a movable support 107, such as a microscope stage and illuminated by light from a lamp 102 directed by a collimating lens 103. The brightness of the light from the lamp 102 is monitored through a light guide 101, which may be an optical fibre. The brightness of the lamp 102 is controlled by a potentiometer 5.

The position of the support 107 is measured by X and Y transducers 104 and 105 producing its displacement in two orthogonal directions. Each of the transducers may comprise a scale diffraction grating with the two cursor gratings disposed in quadrature so that light transmission through the scale grating and then through the two cursor gratings separately follows sine and cosine curve respectively. The pitch of the gratings may be, for example, 10 microns.

An image 111 of the object 106 is focused by optical system 108 on a screen 109. A light guide 112, which may be an optical fibre of small diameters, e.g. 0.04 mm, has its end 110 over a fixed area of the screen 109, and forms the aperture for sensing the edge of the image 111 which represents the boundary of the object 106 which is of interest. The screen 109 need not be a physical entity by may merely be the focal plane of the optical system 108.

Figure 2:
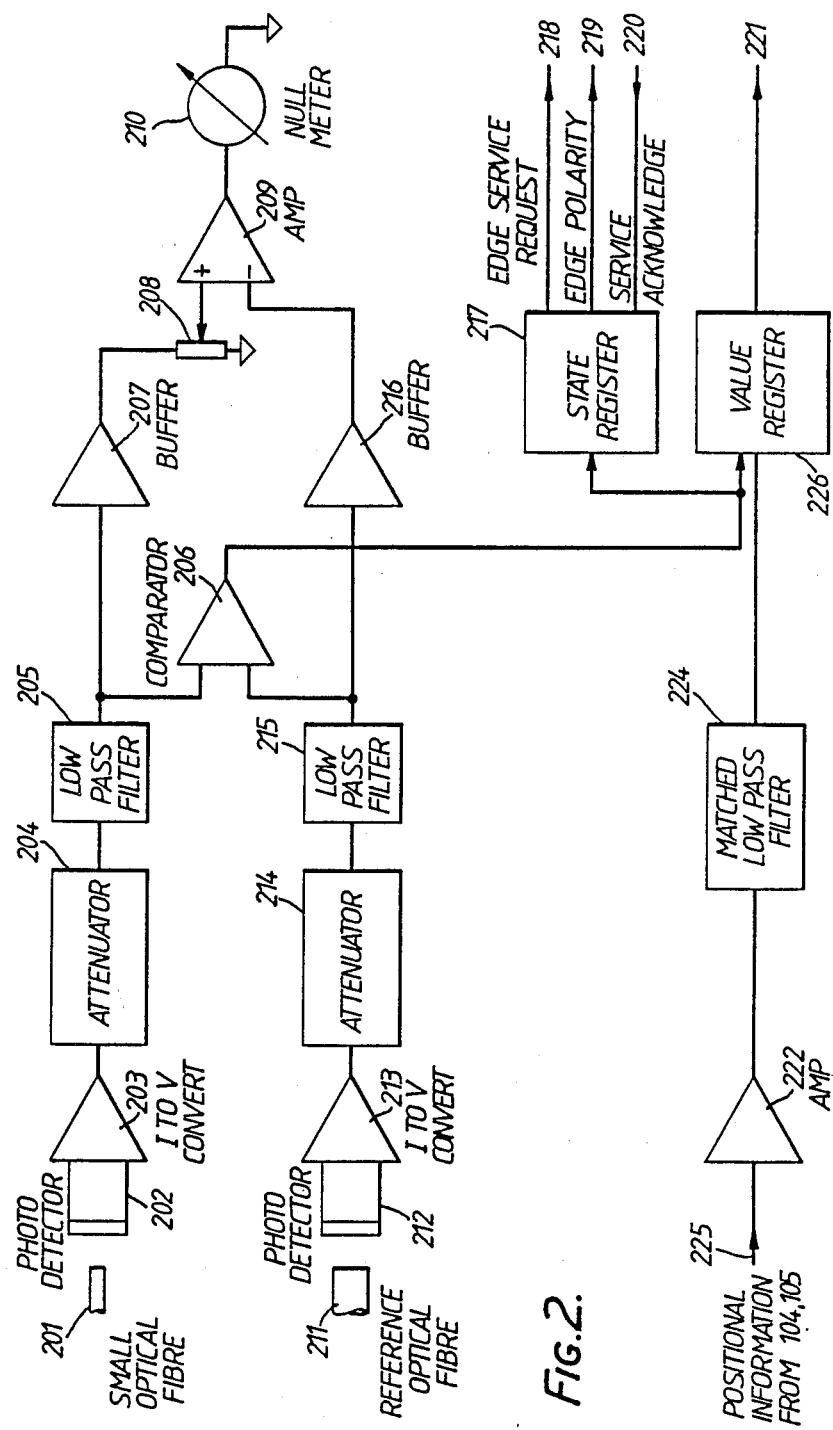
FIG. 2 is a block circuit diagram of the electrical part of an example of the invention.

The circuit diagram shown in FIG. 2 will now be described, with occasional references to items shown in FIG. 1. An edge moving across the edge sensor aperture 110 positioned in the image plane 109 of an optical system 108 produces a change in the light intensity which is transmitted along the light guide 112, 201 to a photosensitive detector 202. The detector generates an electric current proportional to light intensity falling upon it. The current is fed into a low noise amplifier 203 which converts it into a voltage level with sufficient amplification to operate a voltage comparator 206. The amplification is made large enough to exceed the input sensitivity of the comparator. Attenuator 204 is used to adjust the signal gain to an appropriate level to allow for changes in light intensity when different objective lenses are used as the optical system 108. A low pass filter 205 limits the total electronic noise associated with the amplification path 201, 202, 203, 204, 205 including the comparator 206 below the desired limit of resolution of the measuring system.

A similar channel is provided in a reference path formed by optical fibre 211, detector 212, amplifier 213, attenuator 214 and low pass filter 215. This channel monitors changes in the light intensity of the light source 102. Any variation in the light intensity, caused by power variation, ageing or thermal effect, is automatically compensated, ensuring that such changes in the intensity have no influence on measuring accuracy. The bandwidth of the low pass filter 215 in the monitoring channel is adjusted to reduce the electronic noise generated in the signal path 211, 212, 213, 214, 215 to an acceptable level, i.e. below the desired limit of resolution of the measuring system. At the same time the bandwidth is made wide enough to allow slow variations in the light intensity, due to for example, source ageing, power supply instability, alternating current power supply ripple, to be passed to the comparator 206 without attenuation.

Both reference and signal currents emerging from their respective low pass filters 205, 215 are also routed through high impedance buffers 207 and 216 to a difference amplifier 209. A potentiometer 208 adjusts the proportion of the output of the buffer 207 which is applied to the amplifier 209 to compensate differences in gain between the signal and reference paths. In normal operation when the optical system has been configured to give a desired image magnification the attenuator 5 is adjusted until the brightness of the lamp is such that a null meter 210 shows no deflection. Any deviation from zero reading on the nullmeter during normal operation indicates incorrect setting. The potentiometer 208 may be used to adjust the relative edge trigger level in relation to reference voltage. This feature enables adjustment of the edge as represented by an electronic voltage level to coincide with the real edge lying exactly across the middle of the sensing aperture 110 in the image plane 109.

The output from the comparator 206 is used to latch the co-ordinate value information from the transducers 104, 105 in the co-ordinate register 217. Each co-ordinate value signal is conveyed to its register via a path including an amplifier 222 and a low pass filter 224 matched to the filter 205. There may be more than one position co-ordinate register depending on the number of measurement axes installed on the co-ordinate stage 107. The output signal from the comparator 206 may also be used to set a state register 218 which can be used in turn to inform the outside environment such as computer or data logger that a coordinate information corresponding to an edge transition is ready and available in the co-ordinate register and the sense of the transition (light to dark or dark to light). After the co-ordinate information has been read an acknowledge signal 220 can be sent to clear the service request latch and make it ready for next edge transition.

Figure 3:
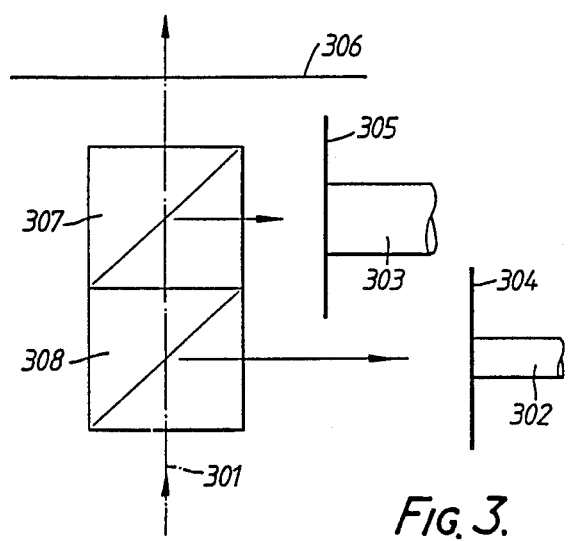
FIG. 3 shows one alternative optical configuration.
Figure 4:
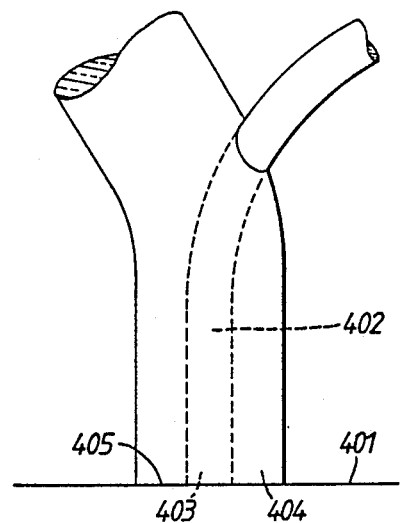
FIG. 4 shows a second alternative optical configuration.
Figure 4:
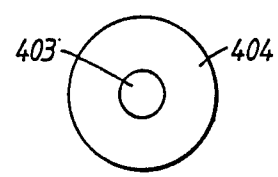
Figure 5:
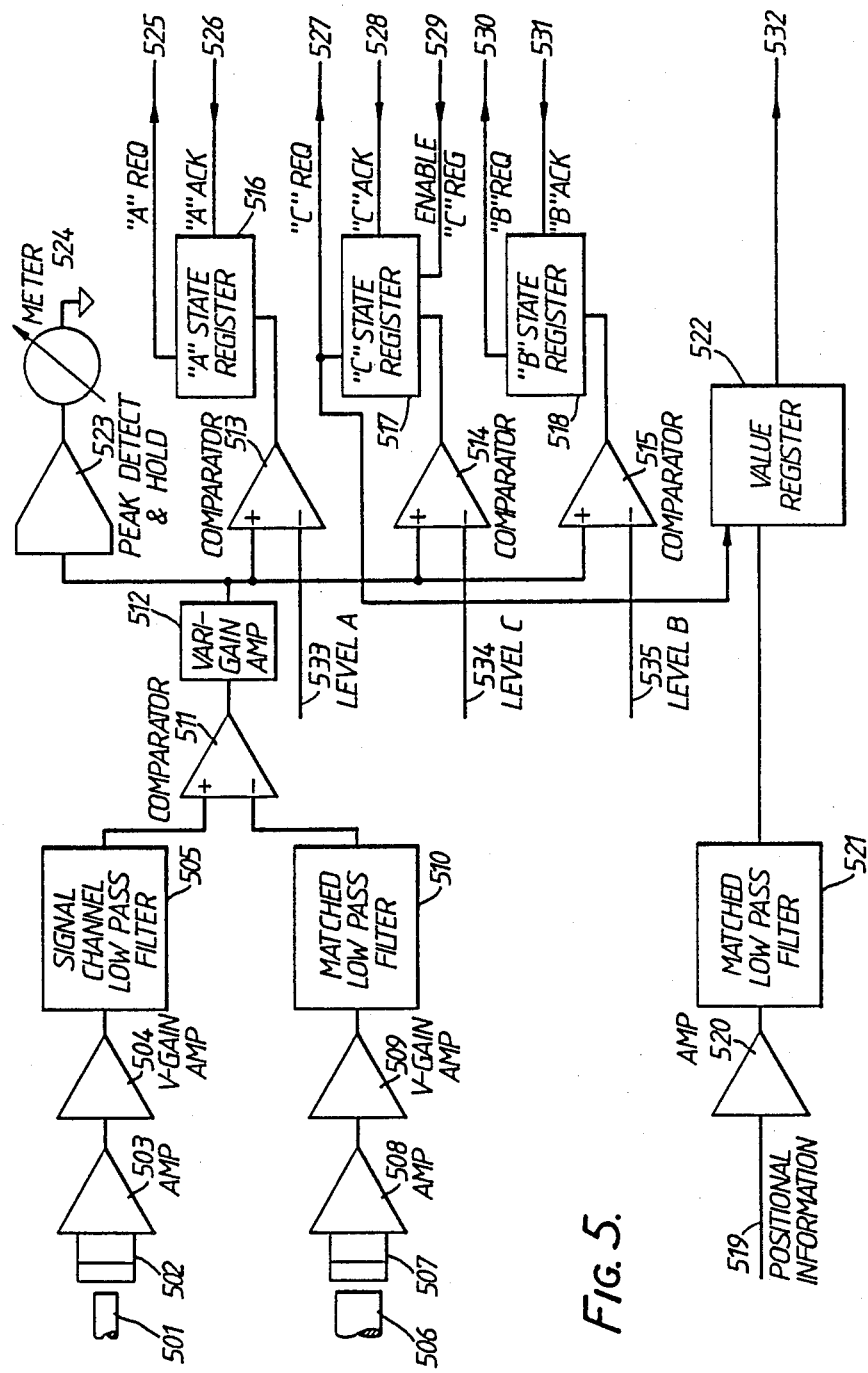
FIG. 5 is a block circuit diagram of the electrical part of another example of the invention.

Alternative ways of providing the reference signal are shown in FIGS. 3, 4 and 5.

A split beam sensor is shown in FIG. 3. The arrangement has the distinct advantage over a concentric fibre aperture in that the symmetry of apertures can readily be obtained since only single fibres are involved.

Light from an objective lens travelling along the optical axis 301 is partially reflected and deviated by the first beam splitter 308 towards the image plane 304 in which the small fibre is positioned. The light captured by this fibre is guided to photodetector 501 in FIG. 5.

The remainder of the light travelling along the optical axis is again partially deflected by the second beam splitter 307 and directed towards the second thicker fibre 303 positioned in the image plane 305. A certain degree of blurring may be advantageous. This light is guided by the fibre to the photocell 507 in FIG. 5. The remaining light emerging from the second beam splitter 307 may be passed on to other uses such as TV camera an eye piece for direct viewing in the image plane 306.

The fractional reflection of each beam splitter can be chosen to suit the requirement of the optical system in use.

A concentric fibre configuration is shown in FIG. 4. It consists of two light guides 403 and 404 the inner and the outer fibres respectively. The inner fibre can be a single strand of plastic type. The outer is normally constructed from a bundle of fine glass fibres and is bonded together with a suitable adhesive. The face 405 of the fibres is polished. The polished fibre face is normally placed in the image plane 401.

The arrangements of FIGS. 3 and 4 could be used with the circuit shown in FIG. 5. This is essentially a differential arrangement which has the following advantages:

1. It can operate with transmitted light or reflected light from the object.
2. The accuracy is not impaired by ambient light changes.
3. It can operate with low edges contrast.

The smaller central fibre 302, 403, 501 guides the light to photodetector 502. The current produced by the detector 502 is amplified by a wide band amplifier 503 and the signal is fed into a variable gain amplifier 504. There is a similar signal path for the larger reference fibre 506 with a detector 507, an amplifier 508 and a variable gain amplifier 509. The variable gain amplifiers 504 and 509 are used to adjust the gains of the two channels so that both inputs to a difference amplifier 511 used as a comparator are the same for a given light level. The inputs to the amplifier 511 are through low pass filters 505 and 510 designed to limit the bandwidth of the two channels in order to reduce the electronic noise to a level below the desired limit of resolution of the system.

A variable gain amplifier 512 is used to adjust the difference signal from the amplifier 511 to a suitable level for comparators 513, 514 and 515, which compare the difference signal with reference levels A, C and B respectively. The difference signal level is monitored on meter 524 to which it is applied via a peak detector and hold amplifier 523.

Figure 6:
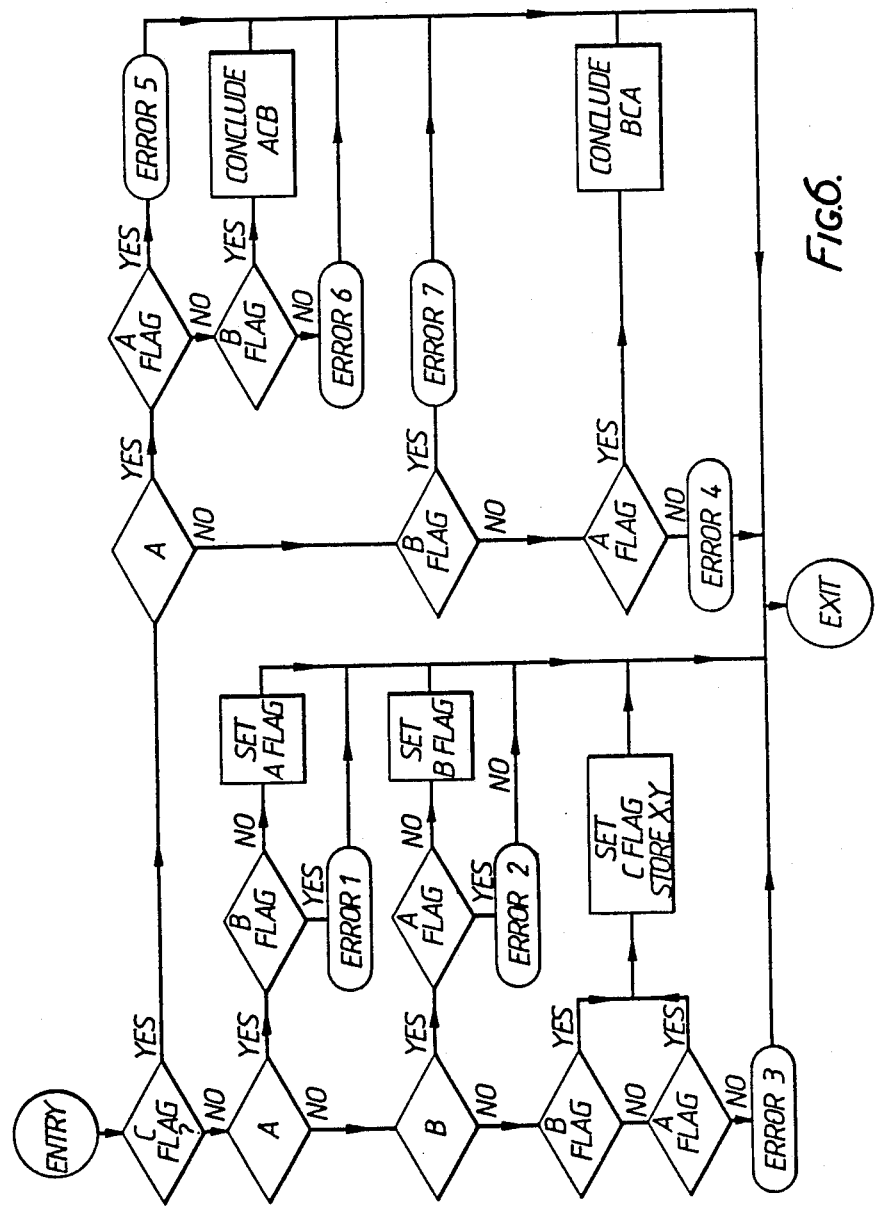
FIG. 6 is a flow diagram of an error detecting routine usable with the circuit of FIG. 5.
Figure 7:
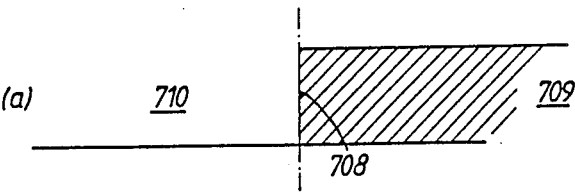
FIGS. 7(a), 7(b), 7(c) and 7(d) are diagrams explaining the basis of the routine shown in FIG. 6.
Figure 7:
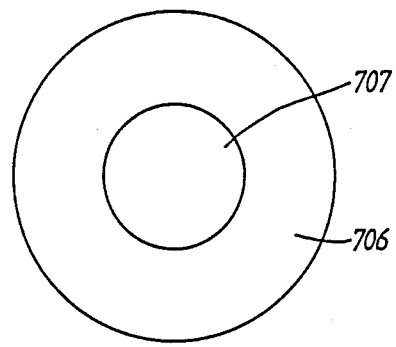
Figure 7:
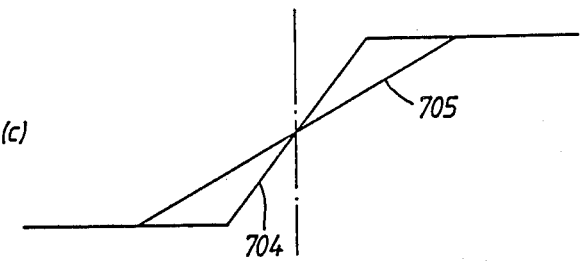
Figure 7:
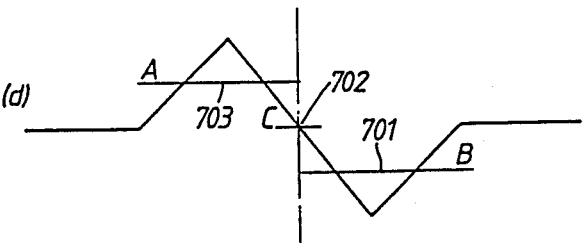

The difference signal, shown in FIG. 7(d) requires three levels of discrimination levels A and B to detect the positive and negative-going peaks and level C to detect the zero crossing. This is discrimination is achieved by means of the three voltage comparators 513, 514 and 515 and their corresponding reference levels 533, 534 and 535. The output from the comparators are routed to three state registers 516, 517 and 518 which interface to an external processing device, such as a computer, for validation of the difference signal, for example by the routine shown in the flow chart of FIG. 6.

The output from "C" state register 517 also is used as the trigger signal for a co-ordinate value register 522 or plurality of registers. This ensures that the co-ordinate value register will only be triggered after the difference signal sequence has been validated by the flow chart of FIG. 6. Note that the validation process used in the flow chart produces a "valid" indication immediately on receipt of the output from the "C" comparator 514.

The positional information from one of the stage transducers 104, 105 enters at 519 and passed through an amplifier 520 and a low pass filter 521 to the co-ordinate value register 522. The information from the other transducer is handled in the same way. When the values have been recorded in the registers they are transferred to the computer or data logger when all those state registers 516, 517 and 518 have been set.

The three low pass filters 505, 510 and 521 are matched so that the total group delay along each of the three channels, the signal channel, the reference channel and the positional information channel, is the same.

The flow chart shown in FIG. 6 looks for C following A without B or C following B without A and when C occurs the co-ordinate values are stored in the register(s). If the signals appear in any order other than ACB of BCA an error is indicated.

In FIG. 7(a) a light to dark transition is shown, which is aligned with the centre of concentric signal and reference apertures 707 and 706. The detector outputs associated with the two apertures as the transition moves over them are shown superimposed in FIG. 7(c) and the resulting difference signal is shown in FIG. 7(d).

Instead of programmable computer, the flow chart shown in FIG. 6 could be performed by a hard-wired special purpose logical unit. The terms computer and computing means used herein are intended to include such a unit.

I claim:

1. A method of measuring the position of an object boundary comprising:
   providing a detector capable of detecting an object boundary and producing a detection signal when the boundary is detected,
   moving the object boundary object to the detector,
   continually producing an indication of the position of the object boundary relative to a datum point fixed in relation to the detector,
   applying the indication to a recording means, recording the value of the indication in the recording means in response to the detection signal from the detector, and
   providing equal delays for the detection signal and the indication in their transmission to the recording means.

2. A method according to claim 1 wherein detection of the object boundary wherein said providing step includes:
   illuminating the object boundary by a light source,
   producing an optical image of the object boundary on a screen by means of a fixed optical system so that the image moves when the object is moved,
   deriving a signal representing the total light falling on a fixed, circular area of the screen,
   moving the fixed, circular area relative to the image, and comparing the signal with a reference level dependent on the illumination from the light source to provide the detection signal in response to the object boundary.

3. A method according to claim 2 wherein the reference signal is derived from the light intensity over an area of the screen surrounding an substantially concentric with the fixed, circular area.

4. Apparatus for measuring the position of a boundary of an object comprising:
   movable support means for supporting an object having a boundary,
   detector means responsive to the boundary for producing a detection signal when the boundary passes the detector means,
   measuring means coupled to the support means for providing an indication of the position of the support as it moves relative to a datum point fixed in relation to the detector means,
   a recording means,
   first connecting means connected between the measuring means and the recording means for applying the position indication to the recording means,
   second connecting means connected between the detector and the recording means for applying the detection signal to the recording means, said recording means for recording the value of the position indication in response to occurrence of the detection signal, and signal delay means selectively provided in the first and second connecting means for making delay in transmission of the position indication from the measuring means to the recording means equal to the delay in transmission of the detection signal from the detector means to the recording means.

5. Apparatus for measuring the position of the boundary of an object comprising:

a support for the object, optical means for forming an image of at least part of the object boundary on a screen movable relative to one another, a first optical fibre coupling light from a first, circular area of the screen to a first light intensity responsive detector, a second optical fibre coupling light from a second, annular area of the screen surrounding and substantially concentric with the first area to a seocnd light intensity responsive detector, comparator means for comparing the signals from the first and second detectors and producing an output signal when the two detector signals have a predetermined relationship, transducer means coupled to the support for producing an electrical signal representing the position of the support relative to a point fixed in relation to the screen, and recording means connected by a first signal path to the transducer means and by a second signal path to the output of the comparator means for recording the position of the support in response to the output signal from the comparator means, wherein the first and second signal paths including means for equating the signal transmission delays therethrough.

6. Apparatus according to claim 5 wherein the signal paths for the signals from the first and second detectors through the comparator means to the recording means and the signal path from the transducer means to the recording means all contain filtering means for equalizing the group delays imposed by the paths.

7. Apparatus according to claim 5 further comprising:

additional means for comparing the signals from the first and second detectors with reference levels, and means responsive to the additional means to produce an error indication when the changes in the signals from the first and second detectors do not follow one or more predetermined patterns indicative of a clear object boundary.

8. Apparatus as in claim 5 wherein said formed image is a virtual image.

9. Apparatus according to claim 5 further comprising:

additional means for comparing the signals from the first and second detectors with reference levels, and computing means programmed to respond to signals from the additional means to produce an error indication when the changes in the signals from the first and second detectors do not follow one or more predetermined patterns indicative of a clear object boundary, the computing means also being connected to control the relative movement of the support and the screen recording the positional value of the boundary.

10. Apparatus according to claim 5 wherein the screen is fixed, the first and second optical fibres are coupled to the first and second areas fixed on the screen, and the support is movable.

11. Apparatus according to claim 10 wherein:

said apparatus further including means for moving the support in two orthogonal directions; and the transducer means includes first and second measuring transducers respectively arranged to produce two electrical signals representing the co-ordinate values of the position of the support relative to a datum in the two directions, the recording means being connected to record both co-ordinate values in response to the output signal from the comparator means.

12. Apparatus according to claim 9, wherein the computing means is programmed to perform a series of measurements on an object and derive therefrom a measure of a particular dimension of the object.

13. A method of measuring the position of an edge of a body comprising the steps of:

placing the body on a movable support, illuminating an edge of the body of interest, forming an image of the illuminated edge on a screen so that the image of the edge moves on the screen as the support is moved, conveying the light from a particular fixed area of the screen to a light intensity responsive detector, deriving a first electrical signal from the detector representing the amount of light received by the detector from the particular fixed area of the screen, deriving a second electrical signal representing the intensity of illumination of the edge, passing the first and second electrical signals through first and second channels respectively to a comparator, comparing the first and second electrical signals in the comparator to produce a particular output signal when the first and second electrical signals have a predetermined relationship to each other, moving the movable support so that the image of the illuminated edge moves across the particular fixed are of the screen, deriving a third electrical signal representing the position of the support as it moves.

passing the third electrical signal through a third signal channel to a recording means, the recording means being also connected to the comparator to receive the particular output signal through a fourth signal channel when said comparator produces said particular output signal, recording in the recording means a representation of the position of the support when the particular output signal is produced by the comparator, wherein the group delays imposed by the first and fourth signal channels on the first electrical signal produced in response to the movement of the image of the illuminated edge across the particular fixed area of the screen from said light responsive detector to the recording means equal to group delay imposed by the third signal channel on the third electrical signal representing the position of the support when it reaches the recording means.

14. Apparatus for measuring the position of an edge of a body comprising:

a movable support for carrying the body, light source means for illuminating the edge of the body, a screen, a fixed lens system for producing an image of the illuminated edge on the screen, first light responsive means, means for conveying the light from a particular fixed area of the screen to the first light responsive means, said first light responsive means for producing a first electrical signal representing the amount of light received by the fixed area of the screen, second light responsive means coupled to receive light from the light source means including light other than from the fixed area for producing a second electrical signal, first and second signal channel means respectively connected from the first and second light responsive means for conveying the first and second electrical signals to inputs of a comparator means;

the comparator means for producing a particular output signal when the first and second electrical signals have a predetermined relationship to each other, means for moving the support so that the image of the illuminated edge moves across the particular fixed area of the screen, measuring means reponsive to the position of the support for producing a third electrical signal representing the position of the support as it moves, recording means for recording a representation of the position of the movable support, a third signal channel means connected from the measuring means, for conveying the third electrical signal to the recording means, and a fourth signal channel means connected from the comparator means, for conveying the particular output signal to the recording means, the recording means recording said representation of the position of the movable support when the particular output signal occurs, at least one of the first, second, third and fourth signal channel means including time delay means for causing the group delay of a first electrical signal produced in repsonse to the passage of the image of the illuminated edge across the fixed area of the screen leaving the first light responsive means and reaching the recording means to equal to the group delay of the third electrical signal from the measuring means reaching the recording means.

15. Apparatus according to claim 14 wherein each of the first, second and third channel means includes low pass filter means for providing the same group delay in each channel.

16. Apparatus for measuring the position of an edge of a body comprising:
 a movable support on which the body is mounted,
 a light source for illuminating the edge of the body,
 means for forming an image of the illuminated edge on a screen,
 light splitting means for directing light from a first circular area of the screen to a first light responsive detector and from a second circular area of the screen layer than and substantially concentric with the first circular area to a second light responsive detector,
 said first and second detector means for producing first and second electrical signals respectively representing the light directed from said first and second circular areas,
 comparator means connected to receive said first and second electrical signals for producing an output signal when the two signals applied to it have a predetermined relationship indicating that an image of an edge is crossing the first circular area,
 first and second channels respectively for transmitting the first and second electrical signals to the comparator means,
 transducer means coupled to the support for producing a third electrical signal representing the position of the support,
 recording means connected to receive the third electrical signal via a third channel and responsive to the output signal from the comparator means for recording a representation of the position of the support at the instant that the output signal is produced, and
 means for making equal to each other the time time delay imposed on the representation of an image of the edge crossing the first circular area conveyed by the first electrical signal from the first prior detector means through the comparator means to the recording means and the time delay imposed on the representation of the position of the support conveyed by the third electrical signal from the transducing means to the recording means.

17. Apparatus according to claim 16 wherein the light splitting means includes:
 a first optical fibre having first and second ends,
 a second optical fibre of larger diameter than the first optical fibre having first and second ends,
 the two fibres being substantially parallel and concentric at their first ends, the first light intensity responsive detector means being coupled to receive light from the second end of the first fibre, and the second light intensity responsive detector means being coupled to receive light from the second end of the second fibre.

18. A method of measuring the position of an object boundary comprising:
 (a) supporting an object and moving said object relative to a stationary position;
 (b) continually producing a signal indicating the position of said object relative to said stationary position;
 (c) detecting coincidence between a bounary of said object and a stationary detection point and producing a signal when said coincidence is detected;
 (d) storing said position indicating signal in response to said coincidence detection signal; and
 (e) compensating for relative delay between said coincidence signal and said position indicating signal.

19. Apparatus for measuring the position of an object boundary comprising:
 means for moveably supporting an object; position measuring means coupled to said supporting means for continually producing a signal indicating the position of said object as said supporting means and said object move relative to a detecting means;
 said detecting means for detecting coincidence between a boundary of said object and a predetermined detection point and for producing a signal when said coincidence is detected;
 recording a signal when said coincidence is detected; recording means connected to receive said coincidence signal and position indicating signal for storing said position indicating signal in response to occurrence of said coincidence signal; and
 delay compensating means for compensating for relative delay between said coincidence signal and said position indicating signal.

* * * * *